(12) United States Patent  (10) Patent No.: US 9,195,940 B2
Coalson  (45) Date of Patent: Nov. 24, 2015

(54) JABBA-TYPE OVERRIDE FOR CORRECTING OR IMPROVING OUTPUT OF A MODEL

(71) Applicant: Yahoo! Inc., Sunnyvale, CA (US)

(72) Inventor: Josh Coalson, San Jose, CA (US)

(73) Assignee: YAHOO! Inc., Sunnyvale, CA (US)

( * ) Notice: Subject to any disclaimer, the term of this patent is extended or adjusted under 35 U.S.C. 154(b) by 276 days.

(21) Appl. No.: 13/844,013

(22) Filed: Mar. 15, 2013

(65) Prior Publication Data

US 2014/0279743 A1  Sep. 18, 2014

(51) Int. Cl.
*G06F 15/18*  (2006.01)
*G06N 5/02*  (2006.01)

(52) U.S. Cl.
CPC .................................. *G06N 5/02* (2013.01)

(58) Field of Classification Search
USPC ........................................................... 706/12
See application file for complete search history.

(56) References Cited

U.S. PATENT DOCUMENTS

| | | | |
|---|---|---|---|
| 5,610,812 A | 3/1997 | Schabes et al. | |
| 6,369,821 B2 * | 4/2002 | Merrill et al. | 345/473 |
| 6,910,004 B2 | 6/2005 | Tarbouriech et al. | |
| 7,702,508 B2 | 4/2010 | Bennett | |
| 8,473,442 B1 | 6/2013 | Deninger et al. | |
| 2002/0008703 A1 * | 1/2002 | Merrill et al. | 345/473 |
| 2005/0283507 A1 | 12/2005 | Souvignier et al. | |
| 2007/0271255 A1 | 11/2007 | Pappo | |
| 2008/0114738 A1 | 5/2008 | Chao | |
| 2009/0182644 A1 | 7/2009 | Panagopulos et al. | |
| 2011/0173174 A1 | 7/2011 | Flitcroft | |
| 2014/0279743 A1* | 9/2014 | Coalson | 706/12 |
| 2014/0279804 A1* | 9/2014 | Coalson | 706/47 |
| 2014/0280358 A1* | 9/2014 | Coalson et al. | 707/798 |
| 2014/0282393 A1* | 9/2014 | Coalson | 717/117 |

OTHER PUBLICATIONS

Improving reusability of dynamic meta modeling specifications with rule overriding Engels, G.; Fisseler, D.; Soltenborn, C. Visual Languages and Human-Centric Computing, 2009. VL/HCC 2009. IEEE Symposium on Year: 2009 pp. 39-46, DOI: 10.1109/VLHCC.2009.5295302 Referenced in: IEEE Conference Publications.*

Automated analysis of CSS rules to support style maintenance Mesbah, A.; Mirshokraie, S. Software Engineering (ICSE), 2012 34th International Conference on Year: 2012 pp. 408-418, DOI: 10.1109/ICSE.2012.6227174 Referenced in: IEEE Conference Publications.*

Trigger inheritance and overriding in an active object database system Bertino, E.; Guerrini, G.; Merlo, I. Knowledge and Data Engineering, IEEE Transactions on Year: 2000, vol. 12, Issue: 4 pp. 588-608, DOI: 10.1109/69.868909 Referenced in: IEEE Journals & Magazines.*

(Continued)

*Primary Examiner* — Michael B Holmes (74) *Attorney, Agent, or Firm* — Berkeley Law & Technology Group, LLP (57) ABSTRACT

Example methods, apparatuses, or articles of manufacture are disclosed that may be implemented, in whole or in part, using one or more computing devices to facilitate or otherwise support one or more processes or operations for a Jabba-type override for correcting or improving output of a model, such as a machine-learned model, for example.

20 Claims, 3 Drawing Sheets

(56) References Cited

OTHER PUBLICATIONS

Collaboration without Rules—A New Perspective on Stability Operations Walker, D.; Atkinson, S.R.; Hossain, L. Social Informatics (SocialInformatics), 2012 International Conference on Year: 2012 pp. 281-288, DOI: 10.1109/SocialInformatics.2012.72 Referenced in: IEEE Conference Publications.*
U.S. Appl. No. 13/842,826, filed Mar. 15, 2013, 80 pages.
U.S. Appl. No. 13/842,826: Filing Receipt, mailed May 10, 2013, 3 pages.
U.S. Appl. No. 13/842,826: Notice to File Missing Parts, mailed May 10, 2013, 2 pages.
U.S. Appl. No. 13/842,826: Response to Pre-Exam Formalities Notice, filed Jun. 20, 2013, 3 pages.
U.S. Appl. No. 13/842,826: Filing Receipt, mailed Jul. 2, 2013, 3 pages.
U.S. Appl. No. 13/842,826: Notice of Publication, mailed Sep. 18, 2014.
U.S. Appl. No. 13/842,826: Non-Final Rejection and Examiner's Search Strategy, mailed Mar. 20, 2015, 21 pages.
U.S. Appl. No. 13/843,292, filed Mar. 15, 2013, 48 pages.
U.S. Appl. No. 13/843,292: Filing Receipt, mailed May 13, 2013, 3 pages.
U.S. Appl. No. 13/843,292: Notice to File Missing Parts, mailed May 13, 2013, 2 pages.
U.S. Appl. No. 13/843,292: Authorization for extension of time, mailed Jun. 24, 2013, 3 pages.
U.S. Appl. No. 13/843,292: Response to Pre-Exam Formalities Notice, filed Jun. 24, 2013, 4 pages.
U.S. Appl. No. 13/843,292: Filing Receipt, mailed Jul. 3, 2013, 3 pages.
U.S. Appl. No. 13/843,292: Notice of Publication, mailed Sep. 18, 2014.
U.S. Appl. No. 13/843,292: Examiner's Search Strategy and Results, mailed Nov. 5, 2014, 3 pages.
U.S. Appl. No. 13/843,292: Non-Final Rejection, mailed Nov. 5, 2014, 10 pages.
U.S. Appl. No. 13/843,292: Amendment/Req Reconsideration After Non-Final Rejection, filed Feb. 5, 2015, 11 pages.
U.S. Appl. No. 13/843,292: Final Rejection and Examiner's Search Strategy, mailed Mar. 19, 2015, 16 pages.
U.S. Appl. No. 13/843,666, filed Mar. 15, 2013.
U.S. Appl. No. 13/843,666: Notice to File Missing Parts, mailed May 10, 2013, 2 pages.
U.S. Appl. No. 13/843,666: Filing Receipt, mailed May 10, 2013, 3 pages.
U.S. Appl. No. 13/843,666: Response to Pre-Exam Formalities Notice, filed Jun. 24, 2013, 60 pages.
U.S. Appl. No. 13/843,666: Filing Receipt, mailed Jul. 2, 2013, 3 pages.
U.S. Appl. No. 13/843,666: Notice of Publication, mailed Sep. 18, 2014, 1 page.
U.S. Appl. No. 13/843,666: Non-Final Rejection and Examiner's Search Strategy, mailed Mar. 24, 2015, 22 pages.
U.S. Appl. No. 13/842,826: Amendment/Req. Reconsideration After Non-Final Rejection, filed Jun. 22, 2015, 16 pages.
U.S. Appl. No. 13/842,826: Final Rejection, mailed Jul. 20, 2015, 25 pages.
U.S. Appl. No. 13/843,292: Response After Final Action and Amendments, filed Jun. 19, 2015, 11 pages.
U.S. Appl. No. 13/843,292: Advisory Action and Amendment, mailed Jul. 1, 2015, 4 pages.
U.S. Appl. No. 13/843,292: Request for Continued Examination and Amendments, filed Jul. 20, 2015, 15 pages.
U.S. Appl. No. 13/843,666: Amendment/Req. Reconsideration After Non-Final Rejection and Amendments, filed Jul. 24, 2015, 15 pages.

* cited by examiner

JABBA-TYPE OVERRIDE FOR CORRECTING OR IMPROVING OUTPUT OF A MODEL

BACKGROUND

1. Field

The present disclosure relates generally to search engine content management systems, and, more particularly, to a Jabba-type override for correcting or improving output of a model for use in or with search engine content management systems.

2. Information

The Internet is widespread. The World Wide Web or simply the Web, provided by the Internet, is growing rapidly, at least in part, from the large amount of content being added seemingly on a daily basis. A wide variety of content, such as one or more electronic documents, for example, is continually being identified, located, retrieved, accumulated, stored, or communicated. Various information databases including, for example, knowledge bases or other collections of content, Web-based or otherwise, have become commonplace, as have related communication networks or computing resources that help users to access relevant information. Effectively or efficiently identifying or locating content of interest may facilitate or support information-seeking behavior of users and may lead to an increased usability of a search engine.

With a large amount of content being available, a number of tools may often be provided to allow for copious amounts of information to be searched through in an efficient or effective manner. For example, service providers may allow users to search the Web or other networks, databases or like data repositories using search engines. In some instances, to facilitate or support one or more processes or operations of a search engine, a machine-learned or like model may, for example, be employed, such as for classifying, tagging, etc. search queries. At times, output of a machine-learned or like model may depend on its training, for example, and may not be accurate or otherwise suitable if unseen data is introduced. Accordingly, how to improve accuracy of a model, such as a machine-learned model, for example, continues to be an area of development.

BRIEF DESCRIPTION OF THE DRAWINGS

Non-limiting and non-exhaustive aspects are described with reference to the following figures, wherein like reference numerals refer to like parts throughout the various figures unless otherwise specified.

DETAILED DESCRIPTION

In the following detailed description, numerous specific details are set forth to provide a thorough understanding of claimed subject matter. However, it will be understood by those skilled in the art that claimed subject matter may be practiced without these specific details. In other instances, methods, apparatuses, or systems that would be known by one of ordinary skill have not been described in detail so as not to obscure claimed subject matter.

Some example methods, apparatuses, or articles of manufacture are disclosed herein that may be used, in whole or in part, to facilitate or support one or more processes or operations for a Jabba-type override for correcting or improving output of a model, such as a machine-learned model, for example. Briefly, Jabba is a novel language for matching or generating sequences of text, such as structured text, for example, as well as for associating actions to one or more match events. For purposes of explanation, somewhat similarly to how regular expressions (RE) match sequences of characters or specify actions (e.g., store matched segments in pattern buffers, etc.), Jabba language or "Jabba" may be used, at least in part, to match sequences of atoms as well as associate relatively complex actions with one or more suitable match processes. As used herein, "Jabba atoms" or simply "atoms" may be used interchangeably and may refer to one or more text fragments that may be classified or tagged with one or more attributes. An atom may comprise, for example, a structured text fragment, such as a string of text, a class that may also be represented via a string (e.g., "place_name," etc.), a set of key-value attributes (e.g., "place_type"="city", "is_unique"=false, etc.), or any combination thereof. It should be appreciated that in some instances, JavaScript Object Notation (JSON)-type string syntax may, for example, be employed, such as if appropriate or applicable. Thus, at times, an attribute may comprise, for example, a string key associated with a JSON value. Claimed subject matter is not limited to a particular implementation, of course.

It should also be noted that even though one or more techniques are described herein in connection with a text processing or matching application, techniques or any aspects thereof may be implemented in connection with any suitable application without deviating from the scope of claimed subject matter and are not limited to a particular taxonomy illustrated herein. For example, it will be understood by skilled artisans that application-specific terms, such as "span," "interpretation," "decoration," etc. may be used interchangeably with analogous or equivalent Jabba terms, such as "atom," "atom sequence," "attribute," etc., respectively. To illustrate, as will be seen, Jabba matching semantics may, for example, be characterized or specified in terms of "atoms" as well as "spans" (e.g., broadly). The former may reference an abstract representation of structured or annotated text, such as while describing Jabba language, for example, and the latter may reference an application-specific implementation of an atom, such as while describing an atom, which maps to a classified fragment of a search query. Again, these are merely examples relating to usage of terms to which claimed subject matter is not limited.

Jabba may comprise, for example, a number of syntax elements, such as one or more match expressions, sequences, alternations, calls, or any combination thereof. Match expressions may, for example, specify how to match a single span. Math expressions may inspect any part of a span and may be composed of subexpressions and operators. To illustrate, <person_name> may comprise syntax for matching any span whose class matches what is in angle brackets, for example. Bare strings like picture and pictures may, for example, match a value of a span itself.

Sequences or alternations may comprise, for example, one or more collections of match expressions or like terms to match zero or more spans. For example, curly braces may specify an ordered sequence of match expressions to match against an interpretation.

Calls may, for example, cause one or more other rules to be executed within a rule. Collectively, one or more match expressions, sequences, alternations, and calls may be called terms. Actions may be associated with one or more terms, for example, to cause something to be added to interpretation decorations or to implement other variable assignments.

Thus, Jabba rules may comprise, for example, one or more named terms. Each rule may be run against an interpretation and for each matching rule, one or more actions in the rule are triggered. Jabba code may comprise, for example, a list of rules run in order against each interpretation. Depending on an implementation, a Jabba rule may, for example, be built up or created from a Boolean match expression that may facilitate or support matching one or more aspects of a candidate atom. For ease of understanding, a Jabba atom may be conceptually thought of as a structural equivalent of a character in RE, and a Jabba rule may be thought of as a named equivalent of an RE pattern. Likewise, Jabba match expressions may, for example, be conceptualized as characters or character classes in RE patterns, for example, except that Jabba match expressions may comprise arbitrary Boolean functions on different parts of a candidate atom. As a way of illustration, the search query "London pictures" may be tokenized via one or more appropriate techniques, processed via a suitable entity recognizer, and broken into a sequence of two Jabba atoms as, for example:

```
"london" class="place"
    attributes={"type":"city","unique":false}
"pictures" class="token" attributes={ }
```

Jabba actions may, for example, cause callbacks to a client to be invoked. For example, one or more callbacks may be specified via Jabba to map one or more Jabba actions into application-specific functionality. If a match is found, for example, a client may receive a callback comprising a name of a Jabba rule that matched as well as all triggered actions. Although claimed subject matter is not necessarily limited in scope in this respect, additional example embodiments or techniques that may be used, at least in part, to match sequences of atoms and associate actions with various match processes via Jabba language (along with related technology) may be discussed in concurrently filed U.S. patent application Ser. No. 13/842,826, titled "JABBA LANGUAGE," filed on Mar. 15, 2013, by Coalson, herein incorporated by reference in its entirety and assigned to the assignee of currently claimed subject matter.

As was indicated, rich or otherwise sufficient matching or action semantics may allow Jabba to be advantageously integrated into a number of text processing or matching applications. For example, as will be seen, Jabba may be used, at least in part, to specify one or more overrides to correct or improve output of a model classifying or tagging search queries in connection with an on-line search, just to illustrate one possible implementation. As used herein, "on-line" may refer to a type of a communication that may be implemented electronically via one or more communications networks, such as, for example, the Internet, an intranet, a communication device network, or the like. Communications networks may comprise, for example, a wireless network, wired network, or any combination thereof. In some instances, one or more overrides specified via Jabba or Jabba-type overrides may be capable of correcting output caused by an error of a machine-learned model without having to retrain or otherwise alter such a model, for example.

Briefly, a search engine may typically comprise a computing platform that may, for example, help a user to locate, retrieve, match, etc. content of interest. In some instances, content may include, for example, on-line content, such as one or more web documents of a particular interest. As used herein, "web document" or "electronic document" may be used interchangeably and may refer to one or more digital signals, such as communicated or stored signals, for example, representing a source code, text, image, audio, video file, or the like. As a way of illustration, web documents may include a web page, a news feed, a rating or review post, a status update, a portal, a blog, an e-mail, a text message, an Extensible Markup Language (XML) document, a web page pointed to by a Uniform Resource Locator (URL), a collection of user-generated content, etc., just to name a few examples. At times, web documents may include one or more embedded references or hyperlinks to images, audio or video files, or other web documents. One common type of reference may comprise, for example, a URL.

In some instances, text patterns associated with web documents may, for example, be matched to a search query or like text input via one or more processing operations in connection with a suitable search engine, such as an on-line search engine, pattern-matching search engine, etc., or any combination thereof. For example, a search engine may interpret one or more provided syntax rules and may perform one or more matching operations with respect to a target character string, buffer, file, web document, etc. Search results of one or more matching operations may comprise, for example, one or more web documents presented to a user (e.g., via a graphical user interface) in an ascending or descending order of relevance. In some instances, search results may comprise, for example, one or more "match" or "no-match" values representative of respective "found" or "not found" Boolean results. Of course, these are merely details relating to search engines and claimed subject matter is not so limited.

As alluded to previously, in some instances, a search engine may employ one or more models, such as machine-learned models, for example, to classify or tag search queries. Typically, output of a machine-learned model depends, at least in part, on how such a model was trained, for example, which may affect accuracy of the model with respect to previously unseen data input. Various techniques employed to make a model more accurate on unseen data may involve a number of unwanted or undesirable tradeoffs. For example, in some instances, feeding correct or desired data back into a training process may alter one or more other parameters of a model leading to its decreased performance. As another possible example, retraining a model may not be practical or otherwise useful, such as if a model is incapable of being retrained relatively quickly to show correct or suitable results in production use. Accordingly, it may be desirable to develop one or more methods, systems, or apparatuses that may improve or affect accuracy of a model, such as a machine-learned model, for example, without altering such a model or its training process.

Thus, as will be described in greater detail below, one or more Jabba rules may be used, at least in part, to specify one or more overrides to correct or improve an output of a model, such as a machine-learned model, for example. In an implementation, in response to a search query, a Jabba rule characterizing or defining a preferred output of a model may, for example, be accessed, and an override path may be selectively generated based, at least in part, on such a rule. Depending on an implementation, a Jabba rule may, for example, be specified via editorial input, user feedback, a feed of structured data, or any combination thereof. For example, a human editor, such as a domain expert, may encode his or her knowledge into a Jabba rule to specify one or more suitable overrides. As another example, a Jabba rule for an override may, for example, be specified via a feedback prompting a user to select correct or otherwise suitable output from a list of choices that may be used, at least in part, for formatting a valid "input,output" pair. The terms like "user," "developer," "designer," or "programmer" may be used interchangeably herein. As yet another possible example, a script converting a suitable feed of structured data to one or more Jabba rules may be utilized, at least in part, to specify an override, such as in connection with a process automating execution of tasks, for example. Of course, these are merely examples relating to specifying one or more Jabba rules for a Jabba-type override, and claimed subject matter is not so limited.

Figure 1:
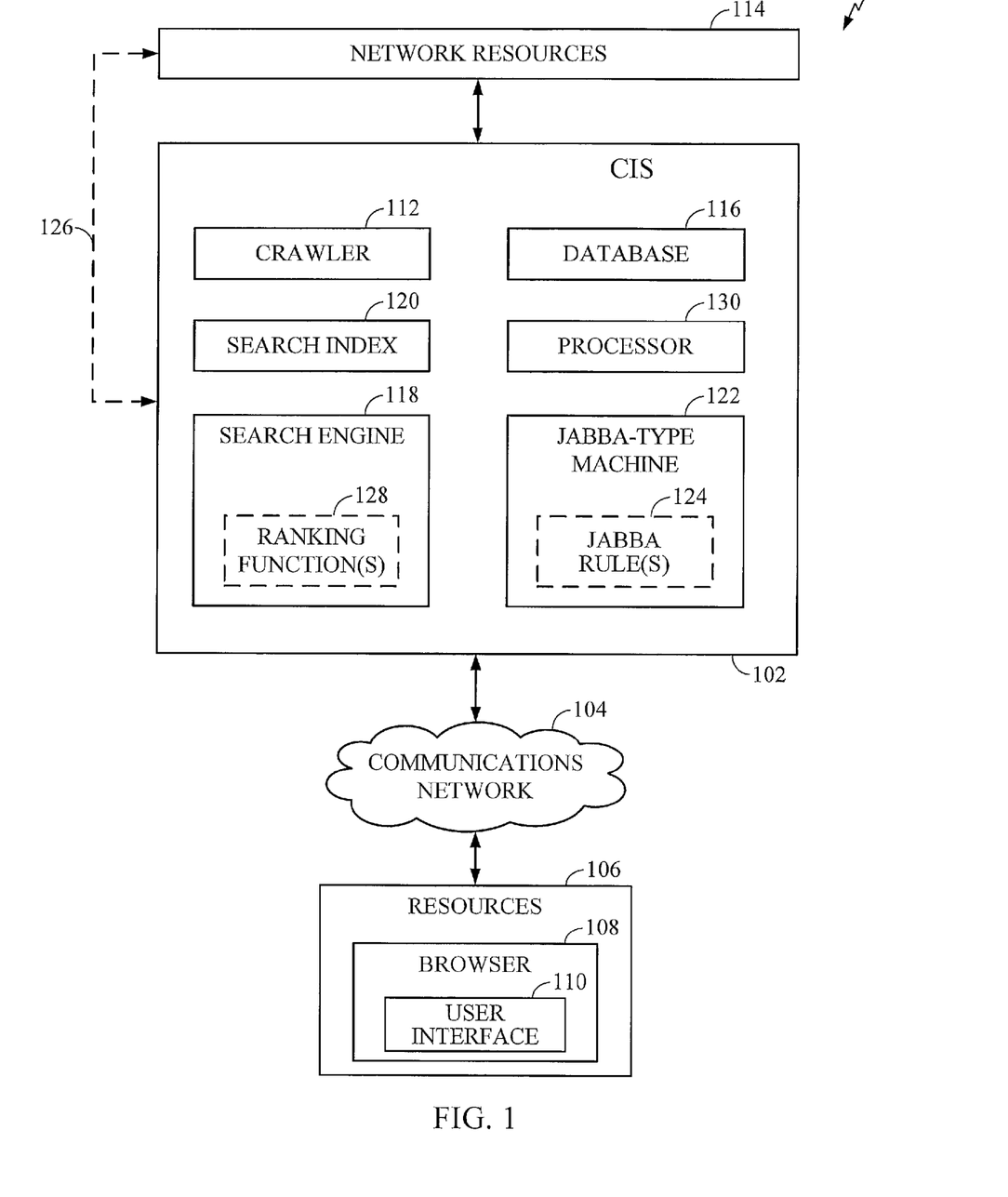
FIG. 1 is a schematic diagram illustrating certain features of an implementation of an example computing environment.

FIG. 1 is a schematic diagram illustrating certain features of an implementation of an example computing environment 100 capable of facilitating or supporting one or more processes or operations for a Jabba-type override for correcting or improving output of a model, such as a machine-learned model, for example. Computing environment 100 may be operatively enabled using one or more special purpose computing apparatuses, communication devices, storage devices, computer-readable media, applications or instructions, various electrical or electronic circuitry, components, etc., as described herein with reference to example implementations.

As illustrated, computing environment 100 may include one or more special purpose computing platforms, such as, for example, a Content Integration System (CIS) 102 that may be operatively coupled to a communications network 104 that a user may employ to communicate with CIS 102 by utilizing resources 106. CIS 102 may be implemented in connection with one or more public networks (e.g., the Internet, etc.), private networks (e.g., intranets, etc.), public or private search engines, Real Simple Syndication (RSS) or Atom Syndication (Atom)-type applications, etc., just to name a few examples.

Resources 106 may comprise, for example, one or more special purpose computing client devices, such as a desktop computer, laptop computer, cellular telephone, smart telephone, personal digital assistant, or the like capable of communicating with or otherwise having access to the Internet via a wired or wireless communications network. Resources 106 may include a browser 108 and a user interface 110, such as a graphical user interface (GUI), for example, that may, for example, initiate transmission of a search query or like text input represented via one or more electrical digital signals. User interface 110 may interoperate with any suitable input device (e.g., keyboard, mouse, touch screen, digitizing stylus, etc.) or output device (e.g., display, speakers, etc.) for interaction with resources 106. Even though a certain number of resources 106 are illustrated, it should be appreciated that any number of resources may be operatively coupled to CIS 102, such as via communications network 104, for example.

In an implementation, CIS 102 may employ a crawler 112 to access network resources 114 that may include suitable content of any one of a host of possible forms (e.g., web pages, search query logs, status updates, location check-ins, audio, video, image, structured or unstructured text files, etc.), such as in the form of stored or communicated binary digital signals, for example. Crawler 112 may store all or part of a located web document (e.g., a URL, link, etc.) in a database 116, for example. CIS 102 may further include a search engine 118 supported by a suitable index, such as a search index 120, for example, and operatively enabled to search for content obtained via network resources 114. Search engine 118 may, for example, communicate with user interface 110 and may retrieve for display via resources 106 a listing of search results via accessing, for example, network resources 114, database 116, search index 120, etc., such as in response to a search query. Network resources 114 may include suitable content, as was indicated, such as represented by stored digital signals, for example, accessible via the Internet, one or more intranets, or the like. For example, network resources 114 may comprise one or more web pages, web portals, status updates, electronic messages, databases, or like collection of stored electronic information.

CIS 102 may further include a suitable machine, such as a Jabba-type machine 122, for example, that may be compiled from one or more Jabba rules 124. As described below, Jabba rules 124 may match input of an erroneous model, for example, and may employ associated Jabba actions specifying correct or suitable output of this model. In at least one implementation, Jabba-type machine 122 may comprise, for example, a nondeterministic finite automaton (NDFA) capable of triggering or executing one or more Jabba actions on nodes of an associated graph representing match points along a sequence of atoms. Jabba-type machine 122 may make callbacks for each match, for example, with all the match actions. Jabba-type machine 122 may also facilitate or support more effective or efficient finding of all matching sequences for a given set of atoms, for example, without generating any sequences that do not match. This may provide advantages in many text processing or matching applications, such as if one or more sequences are not known a priori, for example. In some instances, Jabba-type machine 122 may, for example, implement one or more optimization operations or passes for merging equivalent states and edges of an associated graph. Although claimed subject matter is not necessarily limited in scope in this respect, additional example embodiments or techniques that may be used, at least in part, to match one or more sequences of atoms or generate matching sequences from sets of atoms via a Jabba-type machine (along with related technology) may be discussed in concurrently filed U.S. patent application Ser. No. 13/843,292, titled "MACHINE FOR RECOGNIZING OR GENERATING JABBA-TYPE SEQUENCES," filed on Mar. 15, 2013, by Coalson, herein incorporated by reference in its entirety and assigned to the assignee of currently claimed subject matter.

At times, it may be potentially advantageous to utilize one or more real-time or near real-time indexing or searching techniques, for example, so as to keep a suitable index (e.g., search index 120, database 116, etc.) sufficiently updated. In this context, "real time" may refer to an amount of timeliness of content, which may have been delayed by, for example, an amount of time attributable to electronic communication as well as other signal processing. For example, CIS 102 may be capable of subscribing to one or more social networking platforms, news feeds, location check-in services, or other content, on-line or otherwise, via a content feed 126. In some instances, content feed 132 may comprise, for example, a live feed, though claimed subject matter is not so limited. As such, CIS 102 may, for example, be capable of receiving streaming, periodic, or asynchronous updates via a suitable application programming interface (API) associated with network resources 114. At times, content feed 126 may be used, at least in part, to communicate structured data, such as to implement one or more Jabba rules to facilitate or support generating an override path via Jabba-type machine 122. In some implementations, network resources 114 may include a suitable pattern-matching library (e.g., C++, etc.), which may provide an application programming interface (API) for compiling one or more suitable Jabba rules 124 into Jabba-type machine 122.

As previously mentioned, in some instances, it may be desirable to rank retrieved web documents so as to assist in presenting relevant or useful content, such as one or more electronic documents of interest, for example, in response to a search query or like text input. Accordingly, CIS 102 may employ one or more ranking functions 128 that may rank search results in a particular order that may be based, at least in part, on keyword, relevance, recency, usefulness, popularity, or the like including any combination thereof. In some instances, ranking functions 128 may, for example, facilitate or support obtaining or providing one or more "match" or "no-match" values representative of respective "found" or "not found" Boolean results, as was also indicated. As seen, CIS 102 may further include a processor 130 that may, for example, be capable of executing computer-readable code or instructions, implement suitable operations or processes, etc. associated with example environment 100.

As a way of illustration, in operative use, a user may access a search engine website, such as www.yahoo.com, for example, and may submit or input a search query by utilizing resources 106. Browser 108 may initiate communication of one or more electrical digital signals representing a search query from resources 106 to CIS 102, such as via communications network 104, for example. Jabba rules 124 may be accessed by an applicable process, and a text processing pipeline may, for example, be augmented with a Jabba override path at a modeling stage. For example, a sequence of candidate atoms extracted from a search query may be passed through Jabba machine 122. If a match is found, one or more actions from that match result may be used, at least in part, to populate output of a modeling stage. If desired, a model may be consulted to yield its output, for example, which may be merged with or otherwise augment override output. Subsequently, CIS 102 may, for example, look up search index 120 and may establish a listing of web documents relevant to a search query based, at least in part, on an override, Jabba-type machine 122, Jabba rules 124, ranking function(s) 128, database 116, or the like. CIS 102 may further communicate search results to resources 106, such as for displaying via user interface 110, for example.

Figure 2:
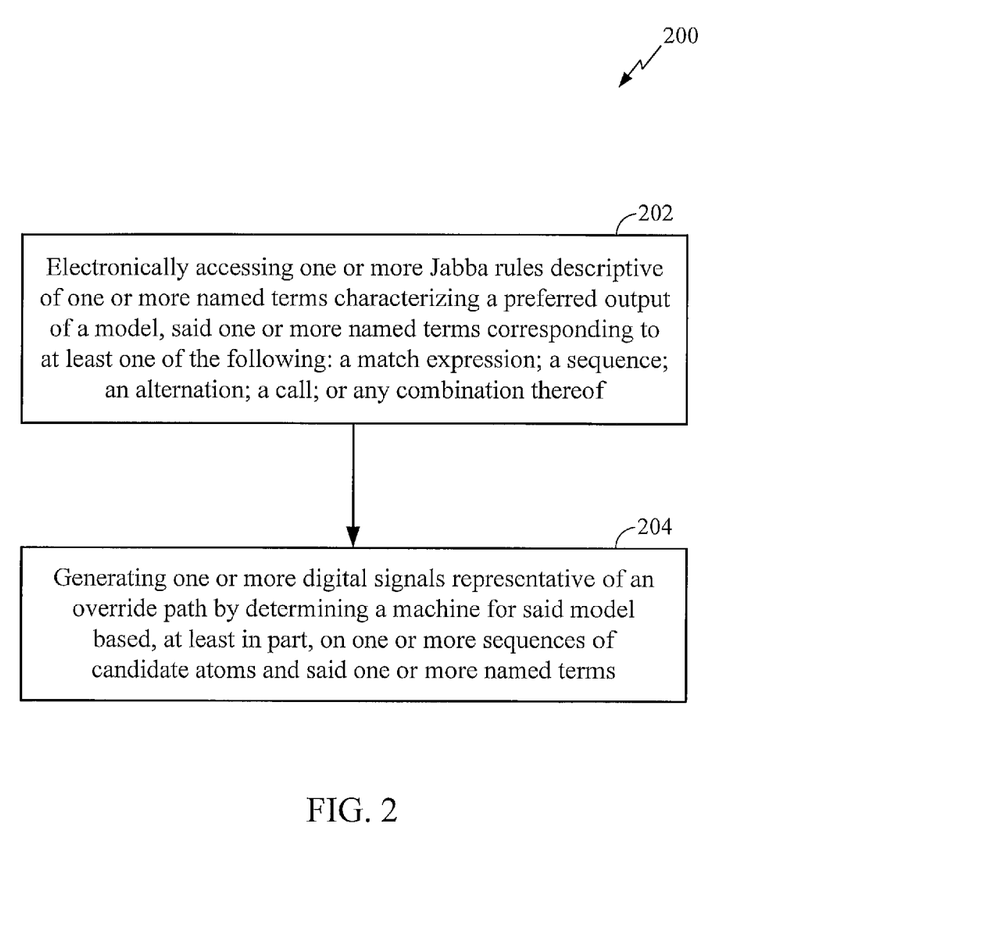
FIG. 2 is a schematic representation of a flow diagram illustrating a summary of an implementation of an example process for a Jabba-type override.

FIG. 2 is a schematic representation of a flow diagram illustrating a summary of an implementation of an example process 200 that may facilitate or support one or more operations or techniques for a Jabba-type override for correcting or improving output of a model, such as a machine-learned model, for example. It should be noted that electronic information applied or produced, such as, for example, inputs, outputs, or results associated with process 200 may be represented via one or more digital signals. It should also be appreciated that even though operations are illustrated or described concurrently or with respect to a certain sequence, other sequences or concurrent operations may also be employed. In addition, although the description below references particular aspects or features illustrated in certain other figures, one or more operations may be performed with other aspects or features.

Example process 200 may, for example, begin at operation 202 with electronically accessing one or more Jabba rules descriptive of one or more named terms characterizing a preferred output of a model. As was indicated, one or more named terms may, for example, correspond to at least one of the following: a match expression; a sequence; an alternation; a call; or any combination thereof. Jabba rules may, for example, be implemented via editorial input, user feedback, a feed of structured data, or any combination thereof. Depending on an implementation, Jabba rules may be stored as one or more electrical digital signals in a suitable database or like information repository, which may be associated with network resources 114, search index 118, database 116, Jabba-type machine 122, etc. of FIG. 1. To illustrate, in at least one implementation, a human editor may express one or more Jabba rules as well an offline model, for example, which may compute correct Jabba rules via techniques that may not be practical or otherwise suitable to use during live production traffic (e.g., due to longer training time, etc.). Thus, in some instances, at startup, a suitable computing platform or device (e.g., a computing platform 300 of FIG. 3, etc.) may, for example, facilitate or support a compilation of these rules into a Jabba-type machine using one or more appropriate techniques. Compilation techniques are generally known and need not be described here in greater detail. A search query, at or upon arrival, may pass through a number of processing stages, for example, to tokenize, normalize, extract one or more candidate atoms, determine one or more interpretations of the search query, or the like. As used herein, "interpretation" may refer to a sequence of classified query fragments or candidate atoms that may imply or convey a specific overall meaning of a search query.

With regard to operation 204, having processed a search query in a suitable manner (e.g., tokenizing, tagging into Jabba atoms, etc.), a process 200 may generate one or more digital signals representative of an override path by determining a Jabba-type machine associated with a model based, at least in part, on one or more sequences of candidate atoms and one or more named terms. For example, in some instances, an override path may be represented via a modeling or override stage at which an interpretation score may be computed or assigned by a machine-learned model based, at least in part, on query classification. Again, a Jabba-type machine (along with related technology) may be discussed in concurrently filed U.S. patent application Ser. No. 13/843,292, titled "MACHINE FOR RECOGNIZING OR GENERATING JABBA-TYPE SEQUENCES," filed on Mar. 15, 2013, by Coalson, herein incorporated by reference in its entirety and assigned to the assignee of currently claimed subject matter. As was indicated, at times, an NDFA may, for example, be utilized, in whole or in part.

More specifically, before a modeling stage assigning a score to an interpretation, an interpretation sequence may, for example, be converted into one or more Jabba atoms and passed through a Jabba machine that has been compiled from one or more Jabba rules for an override (e.g., at or upon startup, etc.). If a sequence recognizer of a Jabba-type machine finds a match with a Jabba rule for an override, for example, an associated interpretation may be assigned a score from an action of such a rule. In some instances, such as if no match is found, for example, a suitable machine-learned scoring model or approach may be used, at least in part, to determine or provide an interpretation score. Thus, before output is generated at a final processing stage, an override path may, for example, be implemented (e.g., via a graph, state diagram, etc.) so as to force output to match any matches found via a Jabba-type machine. If a search query matches a Jabba-type machine, then output may be taken from an override instead of one or more previous modeling stages. An override may be implemented so as to completely override one or more previous modeling stages (e.g., merge), for example, or to augment these one or more stages, such that a suitable or useful interpretation of a search query may be available for future processes of like search queries.

As a way of illustration, a typical Jabba rule may, for example, look like:

```
rule12a = {
    \paris && < place_name >
```

-continued

```
    \hilton && < organization_name >
}'score=0.1';
rule12b = {
    \paris_hilton && < person_name >
}'score=1.0';
```

As previously mentioned, once interpretations of a search query are available, a suitable model (e.g., machine-learned, etc.) may determine or assign an overall interpretations score capturing an overall meaning of a search query to each interpretation. Here, a search query like "Paris Hilton" may be interpreted to comprise, for example, a token "paris" classified as a place_name, and a token "hilton" classified as an organization_name. A misperforming model may, for example, score a "person name" interpretation equally with a "place+organization" interpretation. An editor may determine that this interpretation is incorrect, meaning that it may be more useful to classify tokens of this search query as a personname, for example. Thus, here, a Jabba-type override may be generated to correct or improve output of this model. For example, a Jabba rule matching an interpretation person_name may be expressed and accessed, such as discussed above, and an override forcing a score for this interpretation to be higher (e.g., 1.0) than a score provided by a model for a place_name and organization_name (0.1) may, for example, be generated.

As seen in this example, a Jabba rule expressed by a domain expert may, for example, assign a higher score for an interpretation in which "paris hilton" is a person's name, and may assign a lower score for paris-the-place+hilton-the-organization. By way of example but not limitation, scores like "perfect," "excellent," "good," "fair," and "bad" may be utilized. In some instances, editorial judgments may, for example, be normalized to a score between zero (0) and one (1). Thus, in addition to forcing an interpretation, a Jabba rule may also force a score, for example, such that at a final stage, a system or process may not put its own judgment on an interpretation, but rather accept or use a score from an override. Of course, these Jabba rules, scores, interpretations, etc. are merely examples to which claimed subject matter is not limited.

Depending on an interpretation score, override output of a model may, for example, be generated at a final stage by augmenting or merging this output with one or more outputs from one or more previous modeling or processing stages. For example, a correct interpretation may be augmented by an interpretation from one or more previous modeling stages, such that a model may be corrected or improved while preserving forced scoring to ensure that future interpretations will not override what is determined to be correct output. In some instances, output from a previous modeling stage may be merged with correct output to completely override a model, as was also indicated.

Accordingly, as discussed herein, a Jabba-type override may provide benefits. For example, one or more errors of a model may be corrected or improved in a separate override stage without having to alter an original model or its training process. In addition, output of one or more Jabba rules may, for example, be predicted more easily, since one or more exact sequences may be specified. This may be advantageous with regard to a statistical or machine-learned model, in which accuracy is typically measured separately. Also, a Jabba-type override may be easier to implement in comparison to a larger model since it may not involve retraining, retesting, or redeploying the model, for example. As such, a Jabba-type override may, for example, allow for a faster incremental improvement to a process handling a larger volume of search queries. Of course, such a description of certain aspects of a Jabba-type override and its benefits is merely an example, and claimed subject matter is not so limited.

Figure 3:
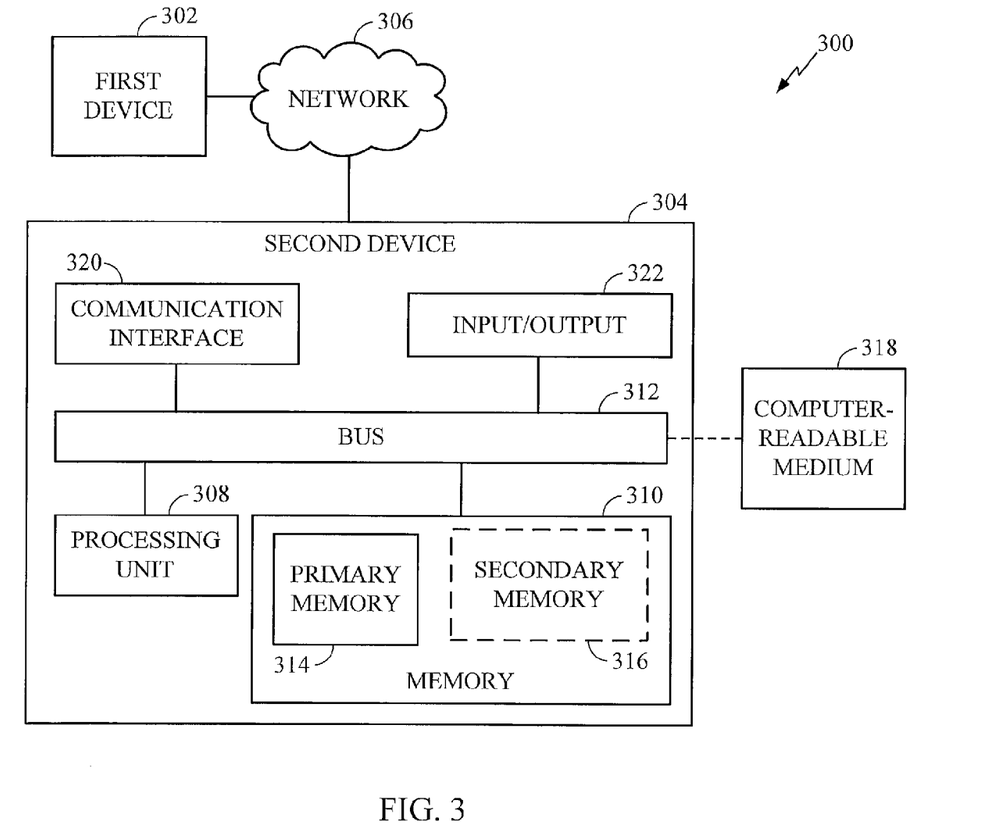
FIG. 3 is a schematic diagram illustrating an implementation of a computing environment associated with one or more special purpose computing apparatuses.

FIG. 3 is a schematic diagram illustrating an example computing environment 300 that may include one or more devices capable of implementing, in whole or in part, one or more processes or operations for a Jabba-type override for correcting or improving output of a model, such as discussed above in connection with FIGS. 1-2, for example. Computing environment system 300 may include, for example, a first device 302 and a second device 304, which may be operatively coupled together via a network 306. In an embodiment, first device 302 and second device 304 may be representative of any electronic device, appliance, or machine that may have capability to exchange content or like signals over network 306. Network 306 may represent one or more communication links, processes, or resources having capability to support exchange or communication of content or like signals between first device 302 and second device 304.

Second device 304 may include at least one processing unit 308 that may be operatively coupled to a memory 310 through a bus 312. Processing unit 308 may represent one or more circuits to perform at least a portion of one or more applicable computing operations or processes. For example, depending on an implementation, processing unit 308 may facilitate or support electronically accessing one or more Jabba rules descriptive of one or more named terms characterizing a preferred output of a model. In addition, in some instances, processing unit 308 may be capable of generating one or more digital signals representative of an override path by determining a Jabba-type machine associated with the model based, at least in part, on one or more sequences of candidate atoms and these one or more named terms. This may, for example, facilitate or support generating an override output of this model by merging the preferred output of the model with these one or more sequences of candidate atoms based, at least in part, on an interpretation score determined for the override output. This may also facilitate or support generating an override output of the model by augmenting the preferred output of the model with these one or more sequences of candidate atoms based, at least in part, on an interpretation score determined for the override output, as was also discussed.

Memory 310 may represent any signal storage mechanism or appliance. For example, memory 310 may include a primary memory 314 and a secondary memory 316. Primary memory 314 may include, for example, a random access memory, read only memory, etc. In certain implementations, secondary memory 316 may be operatively receptive of, or otherwise have capability to be coupled to a computer-readable medium 318. In some instances, memory 310 or any portion thereof may comprise, for example, a non-transitory memory, as discussed below, and may be used, at least in part, for storing one or more Jabba rules, tagged attributes, labels, or the like.

Computer-readable medium 318 may include, for example, any medium that may store or provide access to content or like signals, such as, for example, code or instructions for one or more devices in operating environment 300. It should be understood that a storage medium may typically, although not necessarily, be non-transitory or may comprise a non-transitory device. In this context, a non-transitory storage medium may include, for example, a device that is physical or tangible, meaning that the device has a concrete physical form, although the device may change state. For example, one or more electrical binary digital signals representative of content, in whole or in part, in the form of zeros may change a state to represent content, in whole or in part, as binary digital electrical signals in the form of ones, to illustrate one possible implementation. As such, "non-transitory" may refer, for example, to any medium or device remaining tangible despite this change in state.

Second device 304 may include, for example, a communication adapter or interface 320 that may provide for or otherwise support communicative coupling of second device 304 to a network 306. Second device 304 may include, for example, an input/output device 322. Input/output device 322 may represent one or more devices or features that may be able to accept or otherwise input human or machine instructions, or one or more devices or features that may be able to deliver or otherwise output human or machine instructions.

According to an implementation, one or more portions of an apparatus, such as second device 304, for example, may store one or more binary digital electronic signals representative of content expressed as a particular state of a device such as, for example, second device 304. For example, an electrical binary digital signal representative of content may be "stored" in a portion of memory 310 by affecting or changing a state of particular memory locations, for example, to represent content as binary digital electronic signals in the form of ones or zeros. As such, in a particular implementation of an apparatus, such a change of state of a portion of a memory within a device, such a state of particular memory locations, for example, to store a binary digital electronic signal representative of content constitutes a transformation of a physical thing, for example, memory device 310, to a different state or thing.

Thus, as illustrated in various example implementations or techniques presented herein, in accordance with certain aspects, a method may be provided for use as part of a special purpose computing device or other like machine that accesses digital signals from memory or processes digital signals to establish transformed digital signals which may be stored in memory as part of one or more content files or a database specifying or otherwise associated with a suitable index.

Some portions of the detailed description herein are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels.

Unless specifically stated otherwise, as apparent from the discussion herein, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other content storage devices, transmission devices, or display devices of the special purpose computer or similar special purpose electronic computing device.

Terms, "and" and "or" as used herein, may include a variety of meanings that also is expected to depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein may be used to describe any feature, structure, or characteristic in the singular or may be used to describe some combination of features, structures or characteristics. Though, it should be noted that this is merely an illustrative example and claimed subject matter is not limited to this example.

While certain example techniques have been described or shown herein using various methods or systems, it should be understood by those skilled in the art that various other modifications may be made, or equivalents may be substituted, without departing from claimed subject matter. Additionally, many modifications may be made to adapt a particular situation to the teachings of claimed subject matter without departing from the central concept(s) described herein. Therefore, it is intended that claimed subject matter not be limited to particular examples disclosed, but that claimed subject matter may also include all implementations falling within the scope of the appended claims, or equivalents thereof.

What is claimed is:

1. A method comprising:
   electronically accessing one or more Jabba rules descriptive of one or more named terms characterizing a preferred output of a model, said one or more named terms corresponding to at least one of the following: a match expression; a sequence; an alternation; a call; or any combination thereof; and
   generating one or more digital signals representative of an override path by determining a machine for said model based, at least in part, on one or more sequences of candidate atoms and said one or more named terms;
   wherein said machine comprises a Jabba-type machine capable of executing one or more actions on nodes of an associated graph representing match points along said one or more sequences of said candidate atoms.

2. The method of claim 1, and further comprising generating an override output of said model by augmenting said preferred output of said model with said one or more sequences of said candidate atoms based, at least in part, on an interpretation score determined for said override output.

3. The method of claim 1, and further comprising generating an override output of said model by merging said preferred output of said model with said one or more sequences of said candidate atoms based, at least in part, on an interpretation score determined for said override output.

4. The method of claim 1, wherein said override path is generated selectively in response to a search query.

5. The method of claim 1, wherein said machine comprises a nondeterministic finite state automaton (NDFA).

6. The method of claim 1, wherein said machine comprises an override Jabba-type machine determined before an override output of said model is generated.

7. The method of claim 1, wherein said preferred output of said model comprises an override output of said model.

8. The method of claim 1, wherein said one or more sequences of said candidate atoms are associated with a search query.

9. The method of claim 1, wherein said one or more Jabba rules are implemented via at least one of the following: editorial input; user feedback; a feed of structured data; or any combination thereof.

10. The method of claim 1, wherein said model comprises a machine-learned model.

11. The method of claim 1, wherein said preferred output comprises a known output.

12. The method of claim 11, wherein said known output is determined by a human editor.

13. An apparatus comprising:
a computing platform comprising at least one processor to:
electronically access one or more Jabba rules to be descriptive of one or more named terms to characterize a preferred output of a model, wherein said one or more named terms to correspond to at least one of the following: a match expression; a sequence; an alternation; a call; or any combination thereof; and
generate one or more digital signals to be representative of an override path to determine a machine to be associated with said model to be based, at least in part, on one or more sequences of candidate atoms and said one or more named terms;
said machine to comprise a Jabba-type machine to be capable of execution of one or more actions on nodes of an associated graph to represent match points along said one or more sequences of said candidate atoms.

14. The apparatus of claim 13, wherein said at least one processor further to generate an override output of said model to augment said preferred output of said model with said one or more sequences of said candidate atoms to be based, at least in part, on an interpretation score to be determined for said override output.

15. The apparatus of claim 13, wherein said at least one processor further to generate an override output of said model to merge said preferred output of said model with said one or more sequences of said candidate atoms to be based, at least in part, on an interpretation score to be determined for said override output.

16. The apparatus of claim 13, wherein said machine to comprise an override Jabba-type machine to be determined before an override output of said model is generated.

17. The apparatus of claim 13, wherein said preferred output of said model to comprise an override output of said model.

18. An article comprising:
a non-transitory storage medium having instructions stored thereon executable by a special purpose computing platform to:
electronically access one or more Jabba rules to be descriptive of one or more named terms to characterize a preferred output of a model, wherein said one or more named terms to correspond to at least one of the following: a match expression; a sequence; an alternation; a call; or any combination thereof; and
generate one or more digital signals to be representative of an override path to determine a machine to be associated with said model to be based, at least in part, on one or more sequences of candidate atoms and said one or more named terms;
said non-transitory storage medium having further instructions so that said machine is to comprise a Jabba-type machine to be capable of execution of one or more actions on nodes of an associated graph to represent match points along said one or more sequences of said candidate atoms.

19. The article of claim 18, wherein said non-transitory storage medium further includes instructions to generate an override output of said model to augment said preferred output of said model with said one or more sequences of said candidate atoms to be based, at least in part, on an interpretation score to be determined for said override output.

20. The article of claim 18, wherein said non-transitory storage medium further includes instructions to generate an override output of said model to merge said preferred output of said model with said one or more sequences of said candidate atoms to be based, at least in part, on an interpretation score to be determined for said override output.

* * * * *